United States Patent
Wahl et al.

(10) Patent No.: US 11,194,379 B2
(45) Date of Patent: Dec. 7, 2021

(54) WAKE-UP CIRCUIT AND METHODOLOGY FOR REDUCING FALSE WAKE-UP EVENTS

(71) Applicant: NXP USA, Inc., Austin, TX (US)

(72) Inventors: Volker Dietmar Wahl, Toulouse (FR); Philippe Bernard Roland Lance, Toulouse (FR); Jacques Trichet, Cugnaux (FR)

(73) Assignee: NXP USA, Inc., Austin, TX (US)

( * ) Notice: Subject to any disclaimer, the term of this patent is extended or adjusted under 35 U.S.C. 154(b) by 122 days.

(21) Appl. No.: 16/833,978

(22) Filed: Mar. 30, 2020

(65) Prior Publication Data

US 2020/0326768 A1   Oct. 15, 2020

(30) Foreign Application Priority Data

Apr. 15, 2019 (EP) .................................... 19305486

(51) Int. Cl.
*G06F 1/28* (2006.01)
*G06F 1/32* (2019.01)
*G06F 1/3231* (2019.01)

(52) U.S. Cl.
CPC .............. *G06F 1/3231* (2013.01); *G06F 1/28* (2013.01)

(58) Field of Classification Search
CPC .................................. G06F 1/28; G06F 1/3231
See application file for complete search history.

(56) References Cited

U.S. PATENT DOCUMENTS

| | | | |
|---|---|---|---|
| 8,805,482 B2 | 8/2014 | Sitzman et al. | |
| 9,925,459 B2 | 3/2018 | Mikhailov | |
| 10,609,285 B2* | 3/2020 | Holz | H04N 5/23218 |
| 2010/0304754 A1 | 12/2010 | Czompo et al. | |
| 2010/0321195 A1* | 12/2010 | Morisawa | G01H 1/00 |
| | | | 340/679 |
| 2011/0060930 A1 | 3/2011 | Wu | |
| 2014/0257729 A1* | 9/2014 | Wolf | G01D 4/004 |
| | | | 702/89 |
| 2018/0144111 A1* | 5/2018 | Katingari | G06F 3/0488 |
| 2019/0041958 A1 | 2/2019 | Clark et al. | |

OTHER PUBLICATIONS

Rovere, Giovanni et al.; "A 2.2-µW Cognitive Always-On Wake-Up Circuit for Event Driven Duty-Cycling of IoT Sensor Nodes"; IEEE J. of Emerging and Selected Topics in Circuits and Systems, vol. 8, No. 3; 12 pages (Sep. 2018).

(Continued)

*Primary Examiner* — Mark A Connolly (57) ABSTRACT

A wake-up circuit and method are provided for detecting and preventing false positive wake-up events in an electronic device in a sleep mode. Methodology entails producing first, second, and third sensor signals at successive first, second, and third instants in time in response to a physical stimulus detected by a sensor of the wake-up circuit. The first sensor signal is selected to be a reference value. A first difference value is determined between the second sensor signal land the reference value, a second difference value is determined between the third sensor signal and the reference value, and communication of a wake-up signal to the electronic device is prevented when at least one of the first and second difference values fails to exceed a threshold value.

20 Claims, 4 Drawing Sheets

(56) References Cited

OTHER PUBLICATIONS

Zhang, Xiaoyang et al.; "A 300-mV 200-nW Event Driven ADC with Real-Time QRS Detection for Wearable ECG Sensors"; IEEE Transactions of Biomedical Circuits and Systems, vol. 8, No. 6; 10 pages (Dec. 2014).
Jeong, Seokhyeon et al.; "Always-On 12-nW Acoustic Sensing and Object Recognition Microsystem for Unattended Ground Sensor Nodes"; IEEE Journal of Solid-State Circuits, vol. 53, No. 1; 14 pages (Jan. 2018).

* cited by examiner

WAKE-UP CIRCUIT AND METHODOLOGY FOR REDUCING FALSE WAKE-UP EVENTS

CROSS-REFERENCE TO RELATED APPLICATIONS

This application claims the priority under 35 U.S.C. § 119 of European patent application no. 19305486.3, filed Apr. 15, 2019 the contents of which are incorporated by reference herein.

TECHNICAL FIELD OF THE INVENTION

The present invention relates generally to battery powered electronic devices. More specifically, the present invention relates to a wake-up circuit and methodology for reducing false wake-up events in electronic devices configured to enter a sleep mode.

BACKGROUND OF THE INVENTION

Small electronic devices are utilized in a variety of applications, such as in automobiles, household devices, wearables, sport devices, gaming devices, and so forth. Such electronic devices are often battery driven. In an effort to save power, an electronic device may enter a sleep mode in which power is cut to any unneeded portions of the device. The device wakes from the sleep mode by a number of techniques, such as, detecting motion, touching a key, pressing a button, and the like. Although placing an electronic device in a sleep mode may save power in a battery driven device, further reductions in power consumption would be useful to extend battery life and/or to enable the use of smaller and less expensive batteries.

SUMMARY

Aspects of the disclosure are defined in the accompanying claims.

In a first aspect, there is provided a method comprising: producing a first sensor signal in response to a physical stimulus detected by a sensor of a wake-up circuit at a first instant in time, the first sensor signal being selected to be a reference value; producing a second sensor signal in response to the physical stimulus detected by the sensor at a second instant in time, the second instant in time occurring after the first instant in time; determining a first difference value between the second sensor signal and the reference value; producing a third sensor signal in response to the physical stimulus detected by the sensor at a third instant in time, the third instant in time occurring after the second instant in time; determining a second difference value between the third sensor signal and the reference value; and preventing communication of a wake-up signal to an electronic device in a sleep mode when at least one of the first and second difference values fails to exceed a threshold value.

In one or more embodiments the method may further comprise performing the producing the third sensor signal and determining the second difference value only when the first difference value exceeds the threshold value.

In one or more embodiments the obtaining the reference value may comprise removing a noise component from the first sensor signal to obtain the reference value, the removing operation being performed prior to determining the first and second difference values.

In one or more embodiments the producing the third sensor signal may comprise removing a noise component from the third sensor signal, the removing operation being performed prior to determining the second difference value.

In one or more embodiments the removing the noise component may comprise obtaining multiple successive measurements of the third sensor signal and averaging the multiple successive measurements of the third sensor signal to remove the noise component.

In one or more embodiments the removing the noise component may comprise obtaining the third sensor signal over a measurement duration and filtering the third sensor signal obtained over the measurement duration to remove the noise component.

In one or more embodiments the method may further comprise providing the wake-up signal to the electronic device when both of the first and second difference values exceed the threshold value.

In one or more embodiments the method may further comprise: selecting the third sensor signal to be a second reference value in response to the providing the wake-up signal; producing a fourth sensor signal in response to the physical stimulus detected by the sensor at a fourth instant in time; determining a third difference value between the fourth sensor signal and the second reference value; producing a fifth sensor signal in response to the physical stimulus detected by the sensor at a fifth instant in time, the fifth instant in time following the fourth instant in time; determining a fourth difference value between the fifth sensor signal and the second reference value; and preventing communication of the wake-up signal to the electronic device when at least one of the third and fourth difference values fails to exceed the threshold value.

In one or more embodiments the method may further comprise removing a noise component from the third sensor signal prior to selecting the third sensor signal to be the second reference value.

In one or more embodiments the method may further comprise: performing low-pass filtering of the reference value based upon at least some of the first, second, and third sensor signals to obtain a second reference value in response to the providing the wake-up signal; producing a fourth sensor signal in response to the physical stimulus detected by the sensor at a fourth instant in time; determining a third difference value between the fourth sensor signal and the second reference value; producing a fifth sensor signal in response to the physical stimulus detected by the sensor at a fifth instant in time, the fifth instant in time following the fourth instant in time; determining a fourth difference value between the fifth sensor signal and the second reference value; and when at least one of the third and fourth difference values fails to exceed the threshold value, preventing communication of the wake-up signal to the electronic device.

In one or more embodiments the performing low-pass filtering may utilize a first order infinite impulse response (IIR) filter.

In one or more embodiments the electronic device may be a battery powered device, the sensor may comprise a motion sensor configured to detect motion of the battery powered device, and the first, second, and third sensor signals may indicate the motion of the battery powered device.

In a second aspect, there is provided a wake-up circuit for an electronic device configured to enter a sleep mode, the wake-up circuit comprising: a sensor configured to detect a physical stimulus and produce successive first, second, and third sensor signals in response to the physical stimulus at successive first, second, and third instants in time; and a detection circuit operatively coupled to the sensor for receiving the first, second, and third sensor signals, the detection circuit being configured to select the first sensor signal to be a reference value, determine a first difference value between the second sensor signal and the reference value, determine a second difference value between the third sensor signal and the reference value, prevent communication of a wake-up signal to the electronic device when at least one of the first and second difference values fails to exceed a threshold value, and provide the wake-up signal to the electronic device when both of the first and second difference values exceed the threshold value.

In one or more embodiments the detection circuit may be further configured to remove a noise component from the third sensor signal prior to determining the second difference value.

In one or more embodiments the detection circuit may be further configured to: remove a noise component from the third sensor signal; select the third sensor signal to be a second reference value in response to provision of the wake-up signal and after the noise component is removed from the third sensor signal; receive a fourth sensor signal in response to the physical stimulus detected by the sensor at a fourth instant in time; determine a third difference value between the fourth sensor signal and the second reference value; receive a fifth sensor signal from the sensor in response to the physical stimulus detected by the sensor at a fifth instant in time, the fifth instant in time following the fourth instant in time; determine a fourth difference value between the fifth sensor signal and the second reference value; and prevent communication of the wake-up signal to the electronic device when at least one of the third and fourth difference values fails to exceed the threshold value.

In one or more embodiments the detection circuit may be further configured to: perform low-pass filtering of the reference value based upon at least some of the first, second, and third sensor signals to obtain a second reference value in response to provision of the wake-up signal; receive a fourth sensor signal from the sensor in response to the physical stimulus detected by the sensor at a fourth instant in time; determine a third difference value between the fourth sensor signal and the second reference value; receive a fifth sensor signal from the sensor in response to the physical stimulus detected by the sensor at a fifth instant in time, the fifth instant in time following the fourth instant in time; determine a fourth difference value between the fifth sensor signal and the second reference value; and prevent communication of the wake-up signal to the electronic device when at least one of the third and fourth difference values fails to exceed the threshold value.

In a third aspect, there is provided a system comprising an electronic device configured to enter a sleep mode and further comprising the wake-up circuit.

In one or more embodiments, the electronic device may be a battery powered device, the sensor may comprise a motion sensor configured to detect motion of the battery powered device, and the first, second, and third sensor signals may indicate the motion of the battery powered device.

In a fourth aspect, there is provided a method comprising: producing a first sensor signal in response to a physical stimulus detected by a sensor of a wake-up circuit at a first instant in time, wherein the producing the first sensor signal comprises removing a noise component from the first sensor signal to obtain a reference value; producing a second sensor signal in response to the physical stimulus detected by the sensor at a second instant in time, the second instant in time occurring after the first instant in time; determining a first difference value between the second sensor signal and the reference value; producing a third sensor signal in response to the physical stimulus detected by the sensor at a third instant in time, the third instant in time occurring after the second instant in time, wherein the producing the third sensor signal comprises removing a noise component from the third sensor signal; determining a second difference value between the third sensor signal and the reference value; preventing communication of a wake-up signal to an electronic device in a sleep mode when at least one of the first and second difference values fails to exceed a threshold value; and providing the wake-up signal to the electronic device when both of the first and second difference values exceed the threshold value.

In one or more embodiments, the method may further comprise performing the producing the third sensor signal and determining the second difference value only when the first difference value exceeds the threshold value.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns a wake-up circuit for an electronic device configured to enter a sleep mode and methodology for detecting and preventing false positive wake-up events. More particularly, the wake-up circuit and methodology entail detection of a physical stimulus (e.g., motion, light, pressure, magnetic field, and so forth) at a system in which the wake-up circuit is incorporated. When the physical stimulus is initially detected, additional measurements are performed to obtain a higher precision value which may reject noise-induced false positive wake-up events. In a differential mode of detection, associated low-pass filtering on a reference value (e.g., signal) may enable a stronger rejection of false positives. The wake-up circuit and methodology may be implemented in a wide variety of battery powered devices in which the sensed parameter (e.g., motion) has non-negligible noise as compared to a wake-up threshold. A reduction in false positive wake-up events can result in a significant reduction in power consumption to thereby extend battery life and/or to enable the use of smaller and less expensive batteries. Although battery powered electronic devices are discussed herein, it should be understood that the wake-up circuit and methodology may be adapted for use with other electronic devices configured to enter a sleep mode (e.g., a computer awakened by motion of a computer mouse).

The instant disclosure is provided to further explain in an enabling fashion at least one embodiment in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in integrated circuits (ICs) including possibly application specific ICs or ICs with integrated processing or control or other structures. It is expected that one of ordinary skill, notwithstanding possibly significant effort and many design choices motivated by, for example, available time, current technology, and economic considerations, when guided by the concepts and principles disclosed herein will be readily capable of generating such ICs and structures with minimal experimentation. Therefore, in the interest of brevity and minimization of any risk of obscuring the principles and concepts according to the present invention, further discussion of such structures and ICs, if any, will be limited to the essentials with respect to the principles and concepts of the various embodiments.

Figure 1:
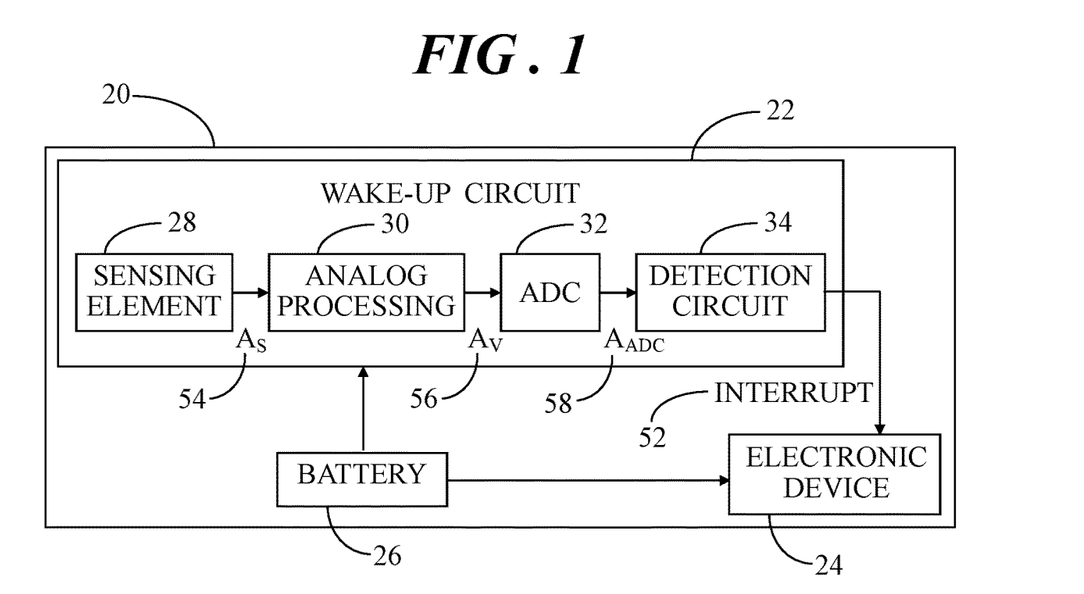
FIG. 1 shows a block diagram of a system that includes a wake-up circuit and an electronic device in accordance with an embodiment.

FIG. 1 shows a block diagram of a system 20 that includes a wake-up circuit 22 and an electronic device 24 in accordance with an embodiment. Wake-up circuit 22 and electronic device 24 may be incorporated into a single device, e.g., system 20. Hence, system 20 may be, for example, an access control key fob for a vehicle or building, a wireless computer mouse, a hearing aid, a TV/stereo remote control, a fitness tracker, a parcel tracking tag, a game controller, and so forth. Wake-up circuit 22 and electronic device 24 may be powered by a battery 26. However, in order to conserve battery power, electronic device 24 may be configured to enter a sleep mode in which power is removed from electronic device 24 when it is not needed. Wake-up circuit 22 does not enter the sleep mode. Wake-up circuit 22 is thus configured to detect a physical stimulus and wake up electronic device 24 from the sleep mode in response to the detected physical stimulus, so that electronic device 24 can perform its intended functions.

In the illustrated example, wake-up circuit 22 includes a sensing element 28 (also referred to herein as a sensor), an analog processing circuit 30, an analog-to-digital converter (ADC) 32, and a detection circuit 34. As will be discussed in significantly greater detail below, wake-up circuit 22 is used to wake up electronic device 24 when, in this example, motion is detected. For example, motion may be detected when a user picks up system 20, when a parcel is being shaken, when a computer mouse is being moved, and so forth.

Figure 2:
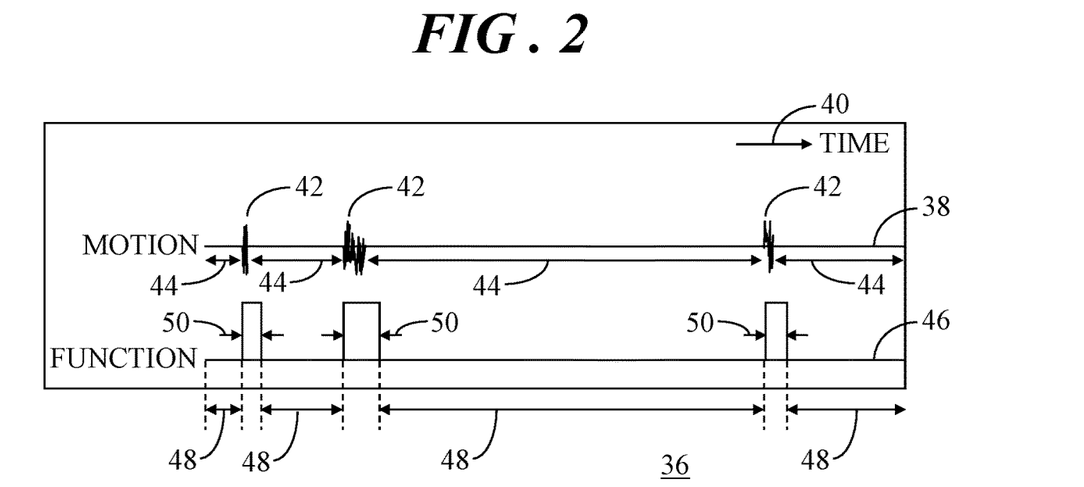
FIG. 2 shows a chart demonstrating a configuration in which an electronic device wakes from a sleep mode in response to detected motion.

Referring to FIG. 2 along with FIG. 1, FIG. 2 shows a chart 36 demonstrating a configuration in which electronic device 24 wakes from a sleep mode in response to detected motion. In particular, a first trace 38 represents a sequence of events relative to time 40 in the form of motion events 42 separated by periods of non-motion 44 of system 20. A second trace 46 represents sleep modes 48 and wake modes 50 of electronic device 24 relative to time 40. When sensing element 28 detects a motion event 42, wake-up circuit 22 provides a wake-up signal (e.g., sets an interrupt 52, see FIG. 1) to enable electronic device 24 to switch from sleep mode 48 to wake mode 50 so that electronic device 24 can perform its intended functions. When sensing element 28 signals that system 20 is no longer in motion, and after some reasonable delay, electronic device 24 can power down most if its functions. Only wake-up circuit 22 and possibly some small logic stays powered to be able to generate the next wake-up signal (e.g., interrupt 52). When system 20 is only moved rarely, large power savings can be achieved so that battery life can be extended or a smaller and cheaper battery may be used.

In some embodiments, sensing element 28 may be an accelerometer, such as in a microelectromechanical systems (MEMS) accelerometer. MEMS accelerometers may be advantageous for motion detection in wake-up circuit 22 because they are small, inexpensive, and consume low power. Even with a low power consumption MEMS accelerometer within wake-up circuit 22, a further reduction of power consumption is highly desirable. In prior art configurations, further reducing power consumption can negatively affect the noise that is inherent in the sensor's measurement procedure. By way of example, when measurement time is increased at analog processing circuit 30 or when multiple measurements are being averaged together (decimation), the noise can be reduced. However, both of these processes can result in greater power consumption. Inversely, acceleration measurements can become noisier when attempting to minimize power consumption.

The noise that is inherent in the sensor's measurement procedure can degrade the measurement result, which has a negative impact on motion detection. The negative impact can be false negatives and false positives. A false negative happens when motion detection should have occurred. However, a motion event was not detected because the threshold for detection was not reached due to the noise. False negatives may not be overly concerning in a number of applications since a motion (e.g., a user picking up a device) typically generates a series of motion events in rapid sequence. As such, even if a single motion event is not detected, the probability of missing multiple successive motion events decreases exponentially.

A false positive happens when no motion event occurs, but the noise inherent in the sensor's measurement procedure causes the measured sensor signal to exceed a motion detection threshold, so that a false motion event is signaled thereby waking up the electronic device. This condition is referred to herein as a false wake-up event. Since the entire electronic device is awakened, such false positives can have a strong negative impact on power consumption, especially if they occur frequently. Wake-up circuit 22 implemented within system 20 functions to avoid false positives for motion detection while concurrently minimizing power consumption for battery powered devices.

Referring back to FIG. 1, sensing element 28 is configured to detect a physical stimulus and produce sensor signals 54, As, in response to the physical stimulus. In an example, sensing element 28 is a MEMS acceleration sensor, as discussed previously. As such the physical stimulus is acceleration, detectable as a capacitance change of the sensor. Although a MEMS accelerometer is discussed herein, other suitable sensors (e.g., rotation, light, pressure, magnetic field, and so forth) may alternatively be utilized in wake-up circuit 22 to wake up an electronic device that is configured to enter a sleep mode. Sensor signals 54 are controlled by analog processing circuit 30, which converts the electrical property change of the sensing element 28 (e.g., the capacitance change in the case of a MEMS acceleration sensor) into electrical sensor signals 56, Av (e.g., voltage levels). Electrical sensor signals 56 are input to ADC 32 which converts the electrical signals to digital sensor signals 58, $A_{ADC}$ (e.g., numerical data). For simplicity, raw sensor signals 54, electrical sensor signals 56, and digital sensor signals 58 will be generically referred to as "sensor signals" herein.

Detection circuit 34 operates on the series of digital sensor signals 58 output from ADC 32. Detection circuit 34 may be implemented in hardware (e.g., digital logic), software, or a combination of hardware and software. In some embodiments, detection circuit 34 operates in a first mode (referred to herein as a referenced mode) to detect motion. In other embodiments, detection circuit 34 operates in a second mode (referred to herein as a differential mode) to detect motion. In both modes of operation, when a potentially false positive is detected, additional measurements are triggered, or an additional measurement with extended measurement time is performed, in order to significantly reduce the probability of generating a false wake-up event (i.e., a false positive) as a consequence of noise. Both modes of operation will be discussed in detail below.

Figure 3:
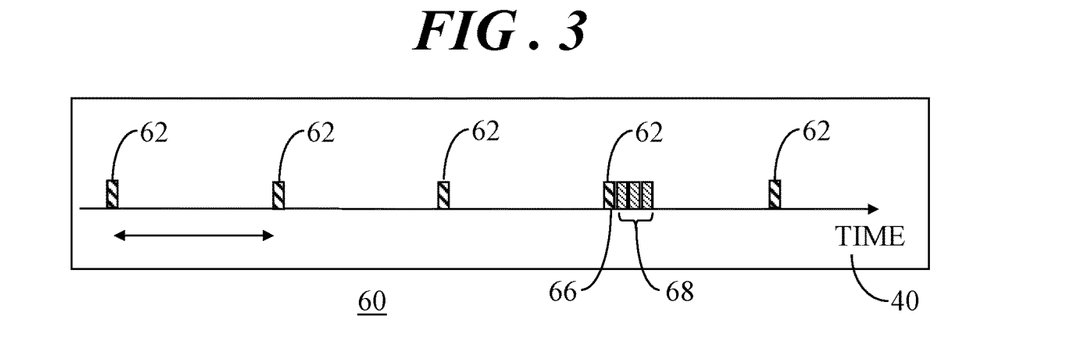
FIG. 3 shows a chart demonstrating the periodic measurements that may occur at the wake-up circuit of FIG. 1 for detecting motion events and additional non-periodic motion detection measurement(s) that may be taken in accordance with some embodiments.

FIG. 3 shows a chart 60 demonstrating the periodic measurements that may occur at wake-up circuit 22 for detecting motion events and additional non-periodic motion detection measurement(s) that may be taken in accordance with some embodiments. In chart 60, scheduled measurement events 62 are represented by vertical bars having wide hatching. Scheduled measurement events 62 are separated or spaced apart relative to time 40 at a predetermined output data rate (ODR), also referred to as measurement frequency or sampling rate. In accordance with both of the referenced and differential modes of operation, if motion is detected during a regularly scheduled measurement event 62, represented in chart 60 as a motion detection event 66, one or more subsequent measurements 68 will be taken. In chart 60, subsequent measurements 68 are represented by vertical bars having narrow, downward directed hatching. These one or more subsequent measurements 68 occur immediately after an initial motion detection event 66 and not in accordance with the scheduled output data rate. Therefore, subsequent measurements 68 can be considered non-periodic measurements. In FIG. 3, multiple measurements are represented by the multiple vertical bars. However, a single subsequent measurement 68 may be taken having an extended measurement duration that may be the combined total duration of the multiple vertical bars.

Figure 4:
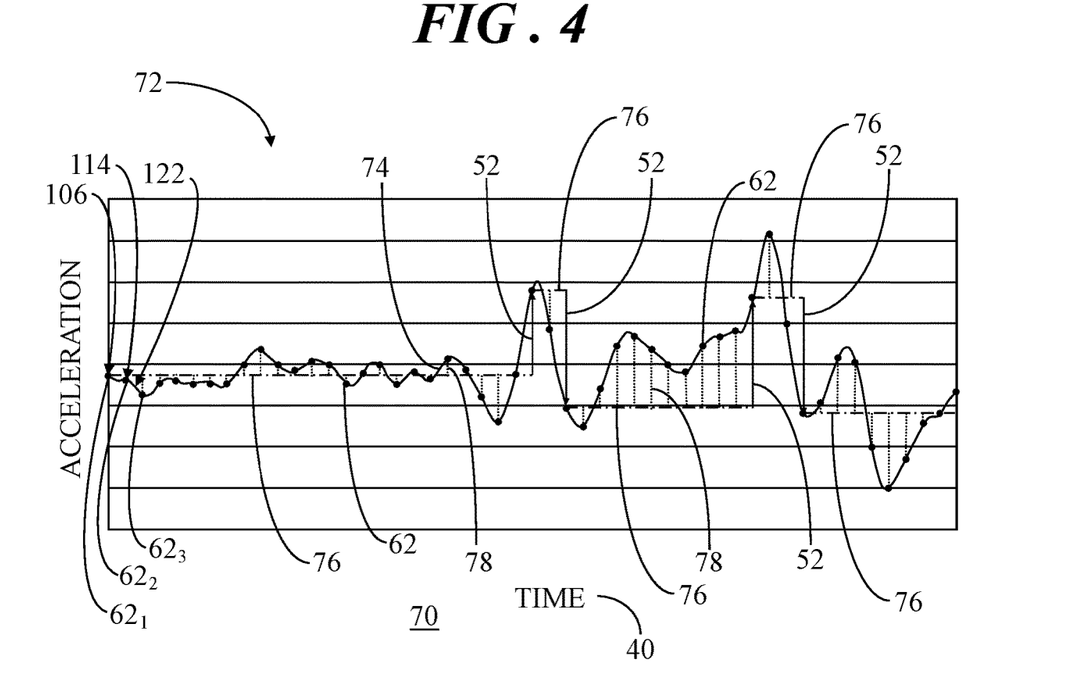
FIG. 4 shows a graph of an example of a referenced mode for detecting a physical stimulus.

FIG. 4 shows a graph 70 of an example of a referenced mode 72 for detecting a physical stimulus. In the example shown in graph 70, the physical stimulus is motion detectable as acceleration. In graph 70, the varying solid line represents continuous-time acceleration 74 relative to time 40, and the periodically spaced dots represent periodic scheduled measurement events 62 (described in connection with FIG. 3). In referenced mode 72, the first measured value (i.e., the initial value) is used as a reference value 76, represented by a dash-dot-dash horizontal line. Motion is detected if the difference between a new measured value and reference value 76 exceeds a predefined threshold. This new value becomes a new, or updated reference value 76, again represented by a dash-dot-dash horizontal line. An interrupt is flagged whenever motion is detected. In graph 70, vertical dotted lines represent a difference value 78 between a new measured value and the reference value 76 when difference value 78 does not exceed the predefined threshold. Vertical solid lines represent motion detection interrupts 52 (e.g., conditions in which the predefined threshold is exceeded, described in connection with FIG. 1) and the time at which reference value 76 is updated. A simplified variant of referenced mode 72 entails using a fixed, predefined reference value that is not updated by motion detection interrupts 52

Figure 5:
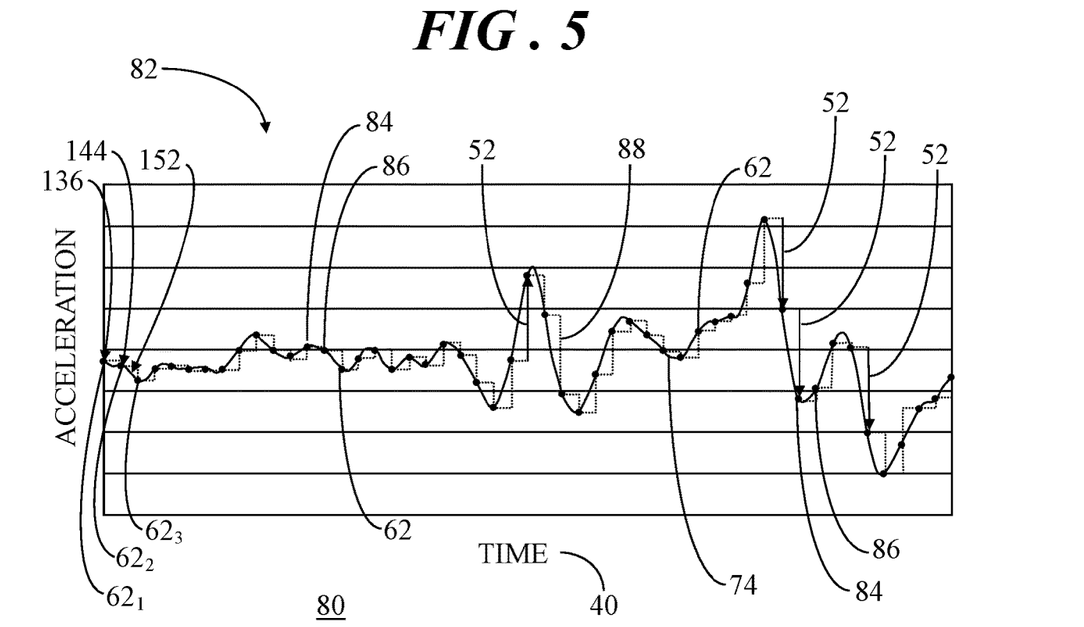
FIG. 5 shows a graph of an example of a differential mode for detecting a physical stimulus.

FIG. 5 shows a graph 80 of an example of a differential mode 82 for detecting a physical stimulus. Again, in the example shown in graph 80, the physical stimulus is motion detectable as acceleration. Like graph 70 (FIG. 4), the varying solid line represents continuous-time acceleration 74 relative to time 40, and the periodically spaced dots represent periodic measurement events 62. In differential mode 82, the difference between two successive measured values is compared against a predefined threshold and motion is detected if the difference between the two successive values exceeds the predefined threshold. Thus, in differential mode 82, an initial measured value obtained at one of measurement events 62 serves as a reference value 84 only to the immediately following "next" measured value 86 taken at the next measurement event 62. In graph 80, vertical dotted lines represent a difference value 88 between two successive measured values. Vertical solid lines represent motion detection interrupts 52, conditions in which the difference between two successive measured values (e.g., reference value 84 and measured value 86) exceeds the predefined threshold.

Depending upon the requirements of a particular application, detection circuit 34 may implement either of referenced and differential modes 72, 82. More particularly, embodiments described herein enable performing additional measurements to obtain a higher precision value which may reject noise-induced false positive wake-up events when a physical stimulus is initially detected, and this technique may be incorporated into either of referenced and differential modes 72, 82.

Figure 6:
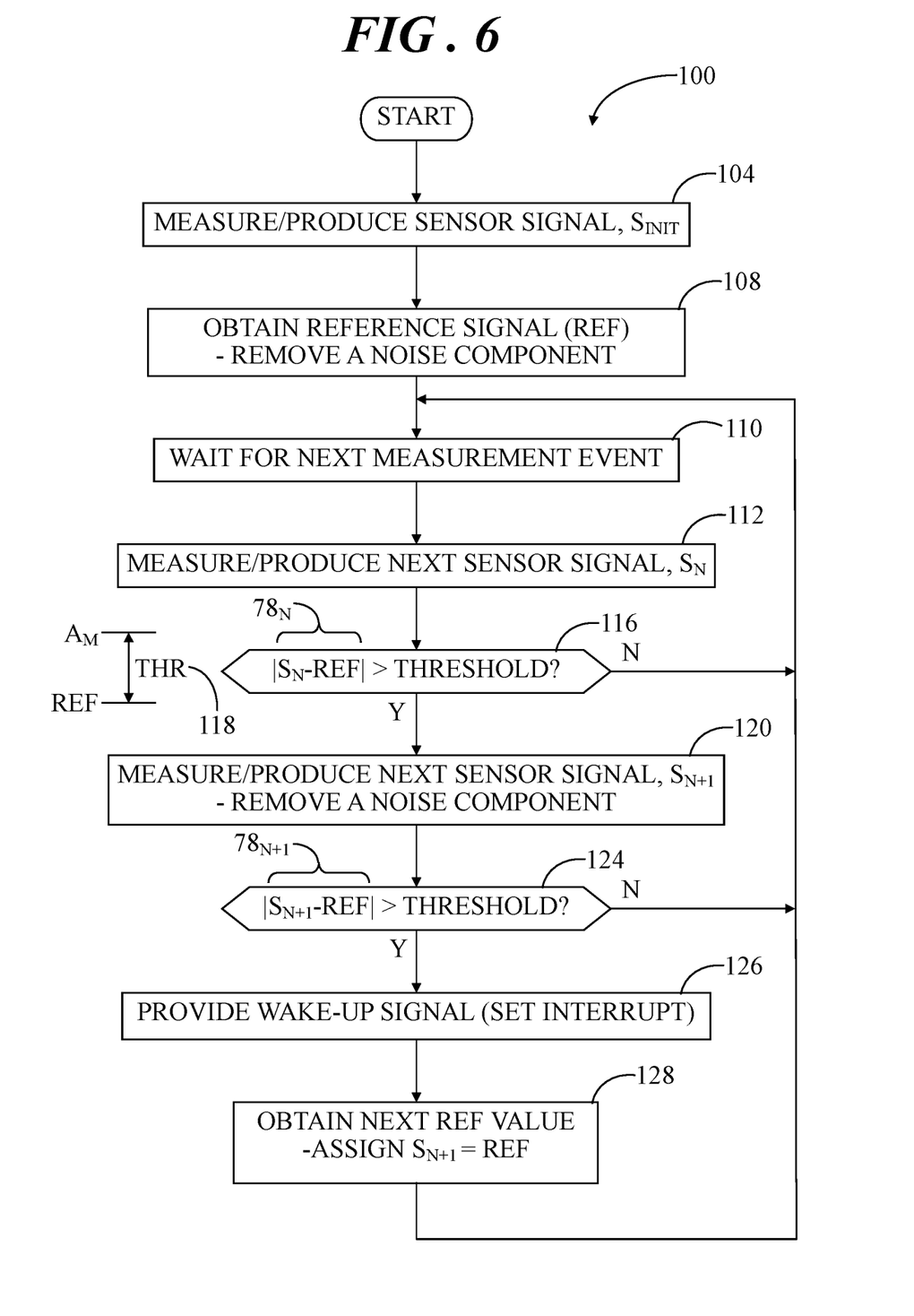
FIG. 6 shows a flowchart of a detection process in accordance with an embodiment.

FIG. 6 shows a flowchart of a detection process 100 in accordance with an embodiment. Detection process 100 is executed at a wake-up circuit to detect a physical stimulus and wake up an electronic device from a sleep mode in response to the detected physical stimulus. More particularly, detection process 100 is executed to detect the physical stimulus, and when the physical stimulus is initially detected, additional measurements are performed to obtain higher precision values in order to reject noise-induced false positive wake-up events.

Detection process 100 is described in connection with wake-up circuit 22 implemented within system 20 that includes battery powered electronic device 24. Execution of detection process 100 may begin after electronic device 24 enters sleep mode 48 (FIG. 2) or detection process 100 may be executed continuously. Thus, detection process 100 is executed to detect motion of system 20 via sensing element 28, which may be a MEMS accelerometer. Additionally, detection process 100 incorporates referenced mode 72 of detection. Accordingly, FIGS. 1 and 4 should be reviewed in connection with the operational blocks of detection process 100. It should be understood, that detection process 100 may be implemented in wake-up circuits that utilize other suitable sensors (e.g., rotation, light, pressure, magnetic field, and so forth) to wake up an electronic device that is configured to enter a sleep mode.

At a block 104, a first sensor signal is measured and produced. For example, at a first measurement event 62 (labeled $62_1$ in FIG. 4), sensing element 28 produces an "initial" or first sensor signal, $S_{INIT}$, in response to a detected physical stimulus (e.g., motion in this example). See FIG. 4 in which an arrow 106 represents the value of acceleration at first measurement event $62_1$. First sensor signal 106, $S_{INIT}$, is suitably processed at analog processing circuit 30, is converted to a digital sensor signal at ADC 32, and is received at detection circuit 34.

At a block 108, detection circuit 34 obtains reference value 76, REF, from the digitized initial sensor signal 106, $S_{INIT}$. In some embodiments, detection circuit 34 obtains reference value 76 by removing a noise component from initial sensor signal 106, $S_{INIT}$, so that reference value 76 is a lower noise measurement, relative to initial sensor signal 106, $S_{INIT}$. Use of the lower noise reference value 76 may reduce the probability of false positives, that might otherwise lead to false wake-up events as discussed above.

The lower noise measurement may be obtained by immediately taking additional measurements instead of waiting for the next measurement event 62. The lower noise measurement (e.g., reference value 76) can be obtained by averaging these multiple measurements (also referred to as decimation). Alternatively, the lower noise measurement may be obtained by extending a measurement duration at the analog side (e.g., analog processing block 30) followed by low pass filtering. Another technique may be to switch the analog circuitry (analog processing block 30) into a low-noise mode. However, such a technique may consume more power. Although some techniques are described herein, those skilled in the art will recognize that alternative techniques may be employed for obtaining the lower noise reference value 76. Regardless of the technique implemented, the additional power consumption used to obtain lower noise reference value 76 may be negligible since this activity will only be performed once when starting motion detection (e.g. the first measurement event 62 after electronic device 24 has entered the sleep mode 48 (FIG. 2).

Next, at a block 110, wake-up circuit 22 waits for the next scheduled measurement event 62. For example, acceleration is measured at a predefined frequency, sometimes referred to as an output data rate (ODR). Thus, a clock signal may trigger the next scheduled measurement event 62.

At a block 112, a next sensor signal is measured and produced. For example, immediately following first measurement event $62_1$, at a second measurement event 62 (labeled $62_2$ in FIG. 4), sensing element 28 produces a "next" or second sensor signal, $S_N$, in response to the detected physical stimulus. Again see FIG. 4 in which an arrow 114 represents the value of acceleration at second measurement event $62_2$. Next sensor signal 114, $S_N$, is suitably processed at analog processing circuit 30, is converted to a digital sensor signal at ADC 32 and is received at detection circuit 34.

At a query block 116, difference value $78_N$ between the next (second) sensor signal 114, $S_N$, and the lower noise reference value 76, REF, is determined (e.g., $S_N$-REF). Further, at query block 116, a determination is made as to whether the absolute value of difference value $78_N$ is greater than a predefined motion detection threshold value. When difference value $78_N$ does not exceed the predefined threshold value, process control loops back to block 110 to wait for the next measurement event 62 (e.g., $62_3$ in the example of FIG. 4). As such, no motion is detected and communication of a wake-up signal (e.g., interrupt 52) to electronic device 24 in sleep mode 48 is prevented. Accordingly, electronic device 24 is not signaled to wake up from sleep mode 48 (FIG. 2) and the current value of lower noise reference value 76, REF, does not change. In this example, a threshold value 118 is designated as a difference between lower noise reference value 76, REF and a predetermined magnitude of acceleration, $A_M$, indicative of motion regardless of the current value of REF. Predefined threshold value 118 depends upon the particular motion being detected. For example, threshold value 118 between 0.1 g and 0.3 g (where "g" is the acceleration due to gravity) may be realistic to detect that a person is walking. In other applications, like detecting head movement for a hearing aid, threshold value 118 for motion detection may be set quite a bit lower.

At query block 116, when the absolute value of difference value $78_N$ exceeds predefined threshold value 118, detection process 100 continues with a block 120. At the initial comparison activity of query block 116, when difference value $78_N$ exceeds predefined threshold value 118, a "potential" motion event is detected. At this point, the potential motion event may be an actual motion event (e.g., system 20 is in motion) or the potential motion event may be a noise-induced motion event (e.g., system 20 is stationary). In prior art systems, this noise-induced motion event could trigger a false positive and thereby cause a noise-induced false positive wake-up event which undesirably consumes battery power.

Continued execution of detection process 100 at block 120 is performed to distinguish an actual motion event from a noise-induced motion event. Furthermore, the continued execution at block 120 and a subsequent query block 124 of detection process 100 is only performed when difference value $78_N$ exceeds predefined threshold value 118.

At block 120, a new measurement with lower noise is immediately made. These immediate measurements are represented by measurements 68 immediately following motion detection event 66 in FIG. 3. As such, this new measurement is not taken at one of periodic measurement events 62. In accordance with block 120, the next or third sensor signal, $S_{N+1}$, is measured and produced in response to the detected physical stimulus. Again see FIG. 4 in which an arrow 122 represents the value of acceleration at a time following second measurement event $62_2$ but preceding a third measurement event $62_3$. Next sensor signal 122, $S_{N+1}$, is suitably processed at analog processing circuit 30, is converted to a digital sensor signal at ADC 32 and is received at detection circuit 34.

In some embodiments, detection circuit 34 obtains next sensor signal 122, $S_{N+1}$ (the third sensor signal), by removing a noise component from next sensor signal 122, $S_{N+1}$, so that next sensor signal 122 is a lower noise measurement. Again, use of the lower noise next sensor signal 122 may reduce the probability of false positives, that might otherwise lead to false wake-up events as discussed above. As described previously, the lower noise measurement may be obtained by immediately taking multiple measurements and averaging these multiple measurements (decimation) to obtain the lower noise next sensor signal 122. Alternatively, the lower noise measurement may be obtained by extending a measurement duration at the analog side (e.g., analog processing block 30) followed by low pass filtering. Again, alternative techniques may be employed for obtaining the lower noise next sensor signal 122.

At a query block 124, another (second) difference value $78_{N+1}$ between the next (third) sensor signal 122, $S_{N+1}$, and the lower noise reference value 76, REF, is determined (e.g., $S_{N+1}$-REF). Further, at query block 124, a determination is made as to whether the absolute value of the second difference value $78_{N+1}$ (e.g., $S_{N+1}$-REF) is greater than a predefined motion detection threshold value 118. When difference value $78_{N+1}$ does not exceed threshold value 118, process control loops back to block 110 to wait for the next measurement event 62 (e.g., $62_3$ in the example of FIG. 4). As such, remeasurement and execution of query block 124 confirms that the "potential" motion event detected at query block 116 may have been a false positive (e.g., a noise-induced motion event in which system 20 is stationary). As such, actual motion of system 20 has not been detected and communication of a wake-up signal (e.g., interrupt 52) to electronic device 24 in sleep mode 48 is prevented. Accordingly, electronic device 24 is not signaled to wake up from sleep mode 48 (FIG. 2) and the current value of lower noise reference value 76, REF, does not change. Accordingly, a false wake-up event is avoided thereby preventing unneeded power consumption.

At query block 124, when the absolute value of the next difference value $78_{N+1}$ (e.g., $S_{N+1}$-REF) exceeds threshold value 118, detection process 100 continues with a block 126. At block 126, a wake-up signal is provided to electronic device 24. That is, interrupt 52 is set. Accordingly, motion interrupt 52 is only set when difference value $78_{N+1}$ between the low noise sensor signal 122, $S_{N+1}$, and lower noise reference value 76 exceeds threshold value 118, thereby waking up electronic device 24. Conversely, communication of motion interrupt 52 to electronic device 24 is prevented when at least one of difference values $78_N$, $78_{N+1}$ fails to exceed threshold value 118.

At a block 128, a "next" reference value is obtained. In accordance with an embodiment of a referenced mode 72 (FIG. 4) of detection, after interrupt 52 has been signaled the low noise sensor signal 122, $S_{N+1}$, is selected as the new or updated reference value 76, REF. Thereafter, detection process 100 loops back to block 110 to wait for the next measurement event 62, produce another (e.g., fourth) sensor signal at block 112 in response to the physical stimulus detected by the sensor at a next (e.g., fourth) instant in time, determine another (e.g. third) difference value between the next sensor signal (e.g., fourth) and the updated reference value 76 at block 116, produce another (e.g., fifth) sensor signal at block 120 at a next (e.g., fifth) instant in time, determine another (e.g., fourth) difference value between the next sensor signal (e.g., fifth) and the updated reference value at block 124, and prevent communication of interrupt 52 to electronic device 24 when at least one of the newly computed difference values fails to exceed threshold value 118. In some configurations, detection process 100 may operate continuously when electronic device 24 is in either of sleep and wake modes 48, 50. In other configurations, execution of detection process 100 may be suspended until electronic device 24 enters sleep mode 48 and the next measurement event 62 occurs.

Figure 7:
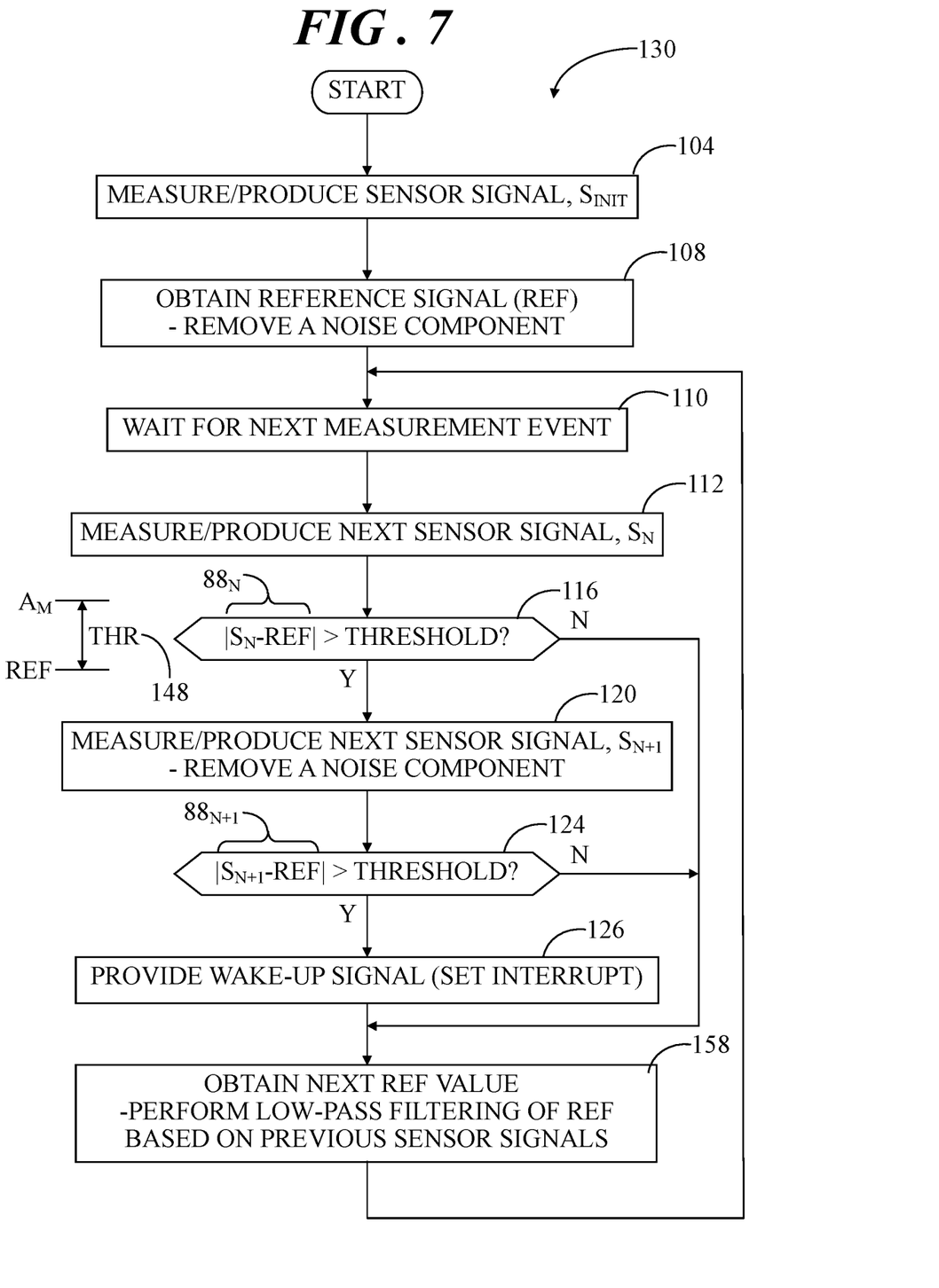
FIG. 7 shows a flowchart of a detection process in accordance with another embodiment.

FIG. 7 shows a flowchart of a detection process 130 in accordance with another embodiment. Again, detection process 130 is described in connection with wake-up circuit 22 implemented within system 20 that includes battery powered electronic device 24. Execution of detection process 130 may begin after electronic device 24 enters sleep mode 48 (FIG. 2) or detection process 130 may be executed continuously. Detection process 130 incorporates differential mode 82 of detection. Accordingly, FIGS. 1 and 5 should be reviewed in connection with the operational blocks of detection process 130. Detection process 130 may be implemented in wake-up circuits that utilize other suitable sensors (e.g., rotation, light, pressure, magnetic field, and so forth) to wake up an electronic device that is configured to enter a sleep mode. A number of the operational blocks of detection process 130 correspond to those discussed in detail in connection with detection process 100 (FIG. 6). Hence, the corresponding blocks will be denoted with the same reference numbers and they will not be described in detail in connection with detection process 130 for brevity.

At block 104, a first sensor signal is measured and produced. At a first measurement event 62 (labeled $62_1$ in FIG. 5), sensing element 28 produces an "initial" or first sensor signal, $S_{INIT}$, in response to a detected physical stimulus (e.g., motion in this example). See FIG. 5 in which an arrow 136 represents the value of acceleration at first measurement event $62_1$. First sensor signal 136, $S_{INIT}$, is suitably processed at analog processing circuit 30, is converted to a digital sensor signal at ADC 32, and is received at detection circuit 34.

At block 108, detection circuit 34 obtains reference value 84, REF, from the digitized initial sensor signal 136, $S_{INIT}$. In some embodiments, detection circuit 34 may obtain reference value 84 by removing a noise component from initial sensor signal 136, $S_{INIT}$, (discussed above at block 108, FIG. 6) so that reference value 84 is a lower noise measurement, relative to initial sensor signal 136, $S_{INIT}$. Use of the lower noise reference value 84 may again reduce the probability of false positives, that might otherwise lead to false wake-up events as discussed above.

Next, at block 110, wake-up circuit 22 waits for the next scheduled measurement event 62. For example, acceleration is measured at a predefined frequency, sometimes referred to as an output data rate (ODR). Thus, a clock signal may trigger the next scheduled measurement event 62.

At block 112, a next sensor signal is measured and produced. For example, immediately following first measurement event $62_1$, at a second measurement event 62 (labeled $62_2$ in FIG. 5), sensing element 28 produces a "next" or second sensor signal, $S_N$, in response to the detected physical stimulus. Again see FIG. 4 in which an arrow 144 represents the value of acceleration at second measurement event $62_2$. Next sensor signal 144, $S_N$, is suitably processed at analog processing circuit 30, is converted to a digital sensor signal at ADC 32 and is received at detection circuit 34.

At query block 116, a "first" difference value $88_N$ between the next (second) sensor signal 86, $S_N$, and the immediately preceding lower noise reference value 84, REF, is determined (e.g., $S_N$-REF). Further, at query block 116, a determination is made as to whether the absolute value of difference value $88_N$ is greater than a predefined motion detection threshold value 148, similar to threshold value 118 discussed above. When difference value $88_N$ does not exceed the predefined threshold value 148, process control continues with a block 158 (discussed below) to update, or otherwise obtain, reference value 84 in accordance with an embodiment of differential mode 82 (FIG. 5) of detection. As such, no motion is detected and communication of a wake-up signal (e.g., interrupt 52) to electronic device 24 in sleep mode 48 is prevented. Accordingly, electronic device 24 is not signaled to wake up from sleep mode 48 (FIG. 2).

However, unlike referenced mode 72 (FIG. 4) of detection process 100, reference value 84 will be updated.

At query block 116, when the absolute value of difference value $88_N$ exceeds predefined threshold value 148, detection process 130 continues with block 120. Continued execution of detection process 130 at block 120 is again performed to distinguish an actual motion event from a noise-induced motion event. Furthermore, the continued execution at block 120 and a subsequent query block 124 of detection process 130 is only performed when difference value $88_N$ exceeds predefined threshold value 148.

At block 120, a new measurement (measurements 68 immediately following motion detection event 66 in FIG. 3) with lower noise (e.g., by decimation, longer measurement time, low noise mode, and so forth as discussed above) is immediately made. As such, this new measurement is not taken at one of periodic measurement events 62. In accordance with block 120, the next or third sensor signal, $S_{N+1}$, is measured and produced in response to the detected physical stimulus. Again see FIG. 5 in which an arrow 152 represents the value of acceleration 74 at a time following second measurement event $62_2$ but preceding a third measurement event $62_3$. Sensor signal 152, $S_{N+1}$, is suitably processed at analog processing circuit 30, is converted to a digital sensor signal at ADC 32 and is received at detection circuit 34. Detection circuit 34 may thereafter remove a noise component from next sensor signal 152, $S_{N+1}$, so that next sensor signal 152 is a lower noise measurement, which may reduce the probability of false positives, that might otherwise lead to false wake-up events as discussed above.

At query block 124, another (second) difference value $88_{N+1}$ between the next (third) sensor signal 152, $S_{N+1}$, and the lower noise reference value 84, REF, is determined (e.g., $S_{N+1}$-REF). Further, at query block 124, a determination is made as to whether the absolute value of the second difference value $88_{N+1}$ (e.g., $S_{N+1}$-REF) is greater than motion detection threshold value 148. When difference value $88_{N+1}$ does not exceed threshold value 148, continues with block 158. As such, remeasurement and execution of query block 124 confirms that the "potential" motion event detected at query block 124 may have been a false positive (e.g., a noise-induced motion event in which system 20 is stationary). Consequently, actual motion of system 20 has not been detected and communication of a wake-up signal (e.g., interrupt 52) to electronic device 24 in sleep mode 48 is prevented. Accordingly, electronic device 24 is not signaled to wake up from sleep mode 48 (FIG. 2). Again, unlike referenced mode 72 (FIG. 4) of detection process 100, reference value 84 will be updated. Accordingly, a false wake-up event is avoided thereby preventing unneeded power consumption.

At query block 124, when the absolute value of difference value $88_{N+1}$ (e.g., $S_{N+1}$-REF) exceeds threshold value 148, detection process 130 continues with block 126. At block 126, a wake-up signal is provided to electronic device 24. That is, interrupt 52 is set. Accordingly, motion interrupt 52 is only set when difference value $88_{N+1}$ between the low noise sensor signal 152, $S_{N+1}$, and lower noise reference value 84 exceeds threshold value 148, thereby waking up electronic device 24. Conversely, communication of motion interrupt 52 to electronic device 24 is prevented when at least one of difference values $88_N$, $88_{N+1}$ fails to exceed threshold value 148.

In accordance with differential mode 82 of detection process 130, a "next" reference value is obtained at block 158 after interrupt 52 has been signaled. Alternately, the "next" reference value is obtained after a negative response at either of query blocks 116 and 124. As mentioned previously, in differential mode 82, the prior art simply uses the previous measured value as the reference value for the next measurement. This previous measured value may be noisy, thereby increasing the probability for false positives. In accordance with some embodiments, low-pass filtering of reference signal 136 may be performed based upon at least some of sensor signals 136, 144, 152 (e.g., the previous reference values and the previous measured sensor values). The low pass filtering could be performed by, for example, an infinite impulse response (IIR) filter or a finite impulse response (FIR) filter. In an embodiment, a first order IIR filter with specific coefficients may be advantageous in that it can have a particularly efficient area and power implementation:

$$\text{REF}[N] = (1-2^{-M}) \times \text{REF}[N-1] + 2^{-M} \times S_N \quad (1)$$

The parameter "M" (a positive integer) can be chosen to control the noise of the REF[N] value. However, the low pass filtering implies a deviation from the original strictly differential motion detection, as the reference value, REF, is no longer the preceding measurement, but is instead a filtered version of the series of the last measurements. If a stronger filtering is chosen, the deviation from the original differential detection becomes bigger. The trade-off between the stronger filtering and the deviation from the original differential detection may be determined individually according to the application.

Thereafter, detection process 130 loops back to block 110 to wait for the next measurement event 62, produce another (e.g., fourth) sensor signal at block 112 in response to the physical stimulus detected by the sensor at a next (e.g., fourth) instant in time, determine another (e.g. third) difference value between the next sensor signal (e.g., fourth) and the updated reference value 84 at block 116, produce another (e.g., fifth) sensor signal at block 120 at a next (e.g., fifth) instant in time, determine another (e.g., fourth) difference value between the next sensor signal (e.g., fifth) and the updated reference value at block 124, and prevent communication of interrupt 52 to electronic device 24 when at least one of the newly computed difference values fails to exceed threshold value 148. In some configurations, detection process 130 may operate continuously when electronic device 24 is in either of sleep and wake modes 48, 50. In other configurations, execution of detection process 130 may be suspended until electronic device 24 enters sleep mode 48 and the next measurement event 62 occurs.

Thus, execution of detection process 100 (FIG. 6) or detection process 130 (FIG. 7) enables detection and prevention of false positive wake-up events in an electronic device configured to enter into and wake up from a sleep mode. It should be understood that certain ones of the process blocks depicted in FIGS. 6 and 7 may be performed in parallel with each other or with performing other processes. In addition, the particular ordering of the process blocks depicted in FIGS. 6 and 7 may be modified, while achieving substantially the same result. Accordingly, such modifications are intended to be included within the scope of the inventive subject matter.

Embodiments disclosed herein entail a wake-up circuit for an electronic device configured to enter a sleep mode and methodology for detecting and preventing false positive wake-up events. An embodiment of a method comprises producing a first sensor signal in response to a physical stimulus detected by a sensor of a wake-up circuit at a first instant in time, the first sensor signal being selected to be a reference value, producing a second sensor signal in response to the physical stimulus detected by the sensor at a second instant in time, the second instant in time occurring after the first instant in time, and determining a first difference value between the second sensor signal and the reference value. The method further comprises producing a third sensor signal in response to the physical stimulus detected by the sensor at a third instant in time, the third instant in time occurring after the second instant in time, determining a second difference value between the third sensor signal and the reference value, and preventing communication of a wake-up signal to an electronic device in a sleep mode when at least one of the first and second difference values fails to exceed a threshold value.

An embodiment of a wake-up circuit for an electronic device configured to enter a sleep mode comprising a sensor configured to detect a physical stimulus and detect successive first, second, and third sensor signals in response to the physical stimulus at successive first, second, and third instants in time and a detection circuit operatively coupled to the sensor for receiving the first, second, and third sensor signals. The detection circuit is configured to select the first sensor signal to be a reference value, determine a first difference value between the second sensor signal and the reference value, determine a second difference value between the third sensor signal and the reference value, prevent communication of a wake-up signal to the electronic device when at least one of the first and second difference values fails to exceed a threshold value, and provide the wake-up signal to the electronic device when both of the first and second difference values exceed the threshold value.

Another embodiment of a method comprises producing a first sensor signal in response to a physical stimulus detected by a sensor of a wake-up circuit at a first instant in time, wherein the producing the first sensor signal comprises removing a noise component from the first sensor signal to obtain a reference value, producing a second sensor signal in response to the physical stimulus detected by the sensor at a second instant in time, the second instant in time occurring after the first instant in time, and determining a first difference value between the second sensor signal and the reference value. The method further comprises producing a third sensor signal in response to the physical stimulus detected by the sensor at a third instant in time, the third instant in time occurring after the second instant in time, wherein the producing the third sensor signal comprises removing a noise component from the third sensor signal, determining a second difference value between the third sensor signal and the reference value, preventing communication of a wake-up signal to an electronic device in a sleep mode when at least one of the first and second difference values fails to exceed a threshold value, and providing the wake-up signal to the electronic device when both of the first and second difference values exceed the threshold value.

A wake-up circuit and method are provided for detecting and preventing false positive wake-up events in an electronic device in a sleep mode. Methodology entails producing first, second, and third sensor signals at successive first, second, and third instants in time in response to a physical stimulus detected by a sensor of the wake-up circuit. The first sensor signal is selected to be a reference value. A first difference value is determined between the second sensor signal and the reference value, a second difference value is determined between the third sensor signal and the reference value, and communication of a wake-up signal to the electronic device is prevented when at least one of the first and second difference values fails to exceed a threshold value.

The wake-up circuit and methodology entail detection of a physical stimulus (e.g., motion, light, pressure, magnetic field, and so forth) at a system in which the wake-up circuit is incorporated. When the physical stimulus is initially detected, additional measurements are performed to obtain a higher precision value which may reject noise-induced false positive wake-up events. In a differential mode of detection, associated low-pass filtering on a reference value (e.g., signal) may enable a stronger rejection of false positives. The wake-up circuit and methodology may be implemented in a wide variety of battery powered devices in which the sensed parameter (e.g., motion) has non-negligible noise as compared to a wake-up threshold. A reduction in false positive wake-up events can result in a significant reduction in power consumption to thereby extend battery life and/or to enable the use of smaller and less expensive batteries.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A method comprising:
producing a first sensor signal in response to a physical stimulus detected by a sensor of a wake-up circuit at a first instant in time, the first sensor signal being selected to be a reference value;
producing a second sensor signal in response to the physical stimulus detected by the sensor at a second instant in time, the second instant in time occurring after the first instant in time;
determining a first difference value between the second sensor signal and the reference value;
producing a third sensor signal in response to the physical stimulus detected by the sensor at a third instant in time, the third instant in time occurring after the second instant in time;
determining a second difference value between the third sensor signal and the reference value; and
preventing communication of a wake-up signal to an electronic device in a sleep mode when at least one of the first and second difference values fails to exceed a threshold value.

2. The method of claim 1 further comprising performing the producing the third sensor signal and determining the second difference value only when the first difference value exceeds the threshold value.

3. The method of claim 1 wherein the obtaining the reference value comprises removing a noise component from the first sensor signal to obtain the reference value, the removing operation being performed prior to determining the first and second difference values.

4. The method of claim 1 wherein the producing the third sensor signal comprises removing a noise component from the third sensor signal, the removing operation being performed prior to determining the second difference value.

5. The method of claim 4 wherein the removing the noise component comprises:
obtaining multiple successive measurements of the third sensor signal; and
averaging the multiple successive measurements of the third sensor signal to remove the noise component.

6. The method of claim 4 wherein the removing the noise component comprises:
obtaining the third sensor signal over a measurement duration; and
filtering the third sensor signal obtained over the measurement duration to remove the noise component.

7. The method of claim 1 further comprising providing the wake-up signal to the electronic device when both of the first and second difference values exceed the threshold value.

8. The method of claim 7 further comprising:
selecting the third sensor signal to be a second reference value in response to the providing the wake-up signal;
producing a fourth sensor signal in response to the physical stimulus detected by the sensor at a fourth instant in time;
determining a third difference value between the fourth sensor signal and the second reference value;
producing a fifth sensor signal in response to the physical stimulus detected by the sensor at a fifth instant in time, the fifth instant in time following the fourth instant in time;
determining a fourth difference value between the fifth sensor signal and the second reference value; and
preventing communication of the wake-up signal to the electronic device when at least one of the third and fourth difference values fails to exceed the threshold value.

9. The method of claim 8 further comprising removing a noise component from the third sensor signal prior to selecting the third sensor signal to be the second reference value.

10. The method of claim 7 further comprising:
performing low-pass filtering of the reference value based upon at least some of the first, second, and third sensor signals to obtain a second reference value in response to the providing the wake-up signal;
producing a fourth sensor signal in response to the physical stimulus detected by the sensor at a fourth instant in time;
determining a third difference value between the fourth sensor signal and the second reference value;
producing a fifth sensor signal in response to the physical stimulus detected by the sensor at a fifth instant in time, the fifth instant in time following the fourth instant in time;
determining a fourth difference value between the fifth sensor signal and the second reference value; and
when at least one of the third and fourth difference values fails to exceed the threshold value, preventing communication of the wake-up signal to the electronic device.

11. The method of claim 10 wherein the performing low-pass filtering utilizes a first order infinite impulse response (IIR) filter.

12. The method of claim 1 wherein the electronic device is a battery powered device, the sensor comprises a motion sensor configured to detect motion of the battery powered device, and the first, second, and third sensor signals indicate the motion of the battery powered device.

13. A wake-up circuit for an electronic device configured to enter a sleep mode, the wake-up circuit comprising:
a sensor configured to detect a physical stimulus and produce successive first, second, and third sensor signals in response to the physical stimulus at successive first, second, and third instants in time; and
a detection circuit operatively coupled to the sensor for receiving the first, second, and third sensor signals, the detection circuit being configured to select the first sensor signal to be a reference value, determine a first difference value between the second sensor signal and the reference value, determine a second difference value between the third sensor signal and the reference value, prevent communication of a wake-up signal to the electronic device when at least one of the first and second difference values fails to exceed a threshold value, and provide the wake-up signal to the electronic device when both of the first and second difference values exceed the threshold value.

14. The wake-up circuit of claim 13 wherein the wake-up circuit and the electronic device are incorporated into a system.

15. The wake-up circuit of claim 13 wherein the electronic device is a battery powered device, the sensor comprises a motion sensor configured to detect motion of the battery powered device, and the first, second, and third sensor signals indicate the motion of the battery powered device.

16. The wake-up circuit of claim 15 wherein the detection circuit is further configured to:
remove a noise component from the third sensor signal;
select the third sensor signal to be a second reference value in response to provision of the wake-up signal and after the noise component is removed from the third sensor signal;
receive a fourth sensor signal in response to the physical stimulus detected by the sensor at a fourth instant in time;
determine a third difference value between the fourth sensor signal and the second reference value;
receive a fifth sensor signal from the sensor in response to the physical stimulus detected by the sensor at a fifth instant in time, the fifth instant in time following the fourth instant in time;
determine a fourth difference value between the fifth sensor signal and the second reference value; and
prevent communication of the wake-up signal to the electronic device when at least one of the third and fourth difference values fails to exceed the threshold value.

17. The wake-up circuit of claim 13 wherein the detection circuit is further configured to remove a noise component from the third sensor signal prior to determining the second difference value.

18. The wake-up circuit of claim 13 wherein the detection circuit is further configured to:
perform low-pass filtering of the reference value based upon at least some of the first, second, and third sensor signals to obtain a second reference value in response to provision of the wake-up signal;
receive a fourth sensor signal from the sensor in response to the physical stimulus detected by the sensor at a fourth instant in time;
determine a third difference value between the fourth sensor signal and the second reference value;

receive a fifth sensor signal from the sensor in response to the physical stimulus detected by the sensor at a fifth instant in time, the fifth instant in time following the fourth instant in time;

determine a fourth difference value between the fifth sensor signal and the second reference value; and prevent communication of the wake-up signal to the electronic device when at least one of the third and fourth difference values fails to exceed the threshold value.

19. A method comprising:

producing a first sensor signal in response to a physical stimulus detected by a sensor of a wake-up circuit at a first instant in time, wherein the producing the first sensor signal comprises removing a noise component from the first sensor signal to obtain a reference value;

producing a second sensor signal in response to the physical stimulus detected by the sensor at a second instant in time, the second instant in time occurring after the first instant in time;

determining a first difference value between the second sensor signal and the reference value;

producing a third sensor signal in response to the physical stimulus detected by the sensor at a third instant in time, the third instant in time occurring after the second instant in time, wherein the producing the third sensor signal comprises removing a noise component from the third sensor signal;

determining a second difference value between the third sensor signal and the reference value;

preventing communication of a wake-up signal to an electronic device in a sleep mode when at least one of the first and second difference values fails to exceed a threshold value; and providing the wake-up signal to the electronic device when both of the first and second difference values exceed the threshold value.

20. The method of claim 19 further comprising performing the producing the third sensor signal and determining the second difference value only when the first difference value exceeds the threshold value.

* * * * *